3,329,714
3-SULFAMIDOCYCLOBUTANONE AND 3-SULF-
AMIDOCYCLOBUTANOL COMPOUNDS AND
THEIR PREPARATION
James C. Martin, Kingsport, Tenn., assignor to Eastman
Kodak Company, Rochester, N.Y., a corporation of
New Jersey
No Drawing. Filed Dec. 9, 1963, Ser. No. 329,255
20 Claims. (Cl. 260—556)

This invention relates to novel chemical compounds and to their preparation. More particularly, it relates to novel 3-sulfamidocyclobutanone and 3-sulfamidocyclobutanol compounds and to their preparation.

The novel 3-sulfamidocyclobutanone and 3-sulfamidocyclobutanol compounds of the invention have the formulas:

I.
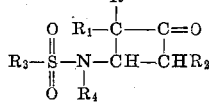

and

II.
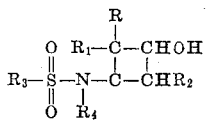

respectively, wherein R and $R_1$ each represents a monovalent organic radical or collectively together with the carbon atom of the cyclobutane ring to which they are attached, form a carbocyclic ring, $R_2$ and $R_4$ each represents hydrogen or an alkyl radical and $R_3$ is an alkyl, an aralkyl, a cycloalkyl, an aryl or a substituted aryl radical. The substituents R and $R_1$ can be the same or different. Similarly, the substituents $R_2$ and $R_4$ can be the same or different.

In the formulas given hereinbefore R and $R_1$ each typically represent: (a) an alkyl radical having 1 to 8 carbon atoms; (b) a phenyl radical; (c) an alkoxyphenyl radical; (d) a methylphenyl radical; (e) an allyl radical, or (f) a carbalkoxy radical wherein the alkoxy moiety has 1 to 8 carbon atoms, and wherein R and $R_1$ collectively, together with the carbon atom of the cyclobutane ring to which they are attached, can be a carbocyclic ring containing 5 to 7 carbon atoms in the ring such as cyclopentylidene, cyclohexylidene, cycloheptylidene and related rings; $R_2$ and $R_4$ are typically hydrogen or an alkyl radical having 1 to 4 carbon atoms; and $R_3$ typically represents: (a) an alkyl radical having 1 to 4 carbon atoms; (b) a phenyl radical; (c) a cyclohexyl radical, and (d) a substituted phenyl radical such as a nitrophenyl radical, a methylphenyl radical or an alkoxyphenyl radical, such as a methoxyphenyl radical or an ethoxyphenyl radical, for example.

The 3-sulfamidobutanone compounds having the Formula I can be prepared by combining a disubstituted ketene having the Formula III and an N-alkenylsulfonamide having the Formula IV. The reaction which takes place can be represented by the following equation wherein the substituents in the formulas are those as described hereinbefore.

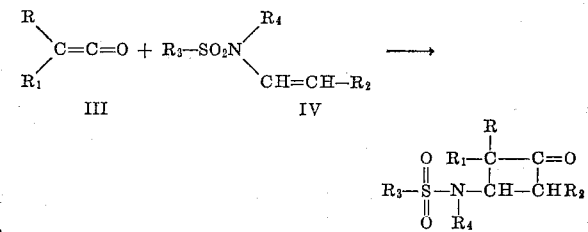

When the substituents R and $R_1$ are alkyl they are usually alkyl of 1 to 8 carbon atoms such as methyl, ethyl, propyl, isopropyl, butyl, sec. butyl, tert. butyl, pentyl, hexyl, heptyl, octyl, 2-ethylhexyl, etc. although they can be a higher alkyl radical such as nonyl, decyl, undecyl, dodecyl, tridecyl, pentadecyl and octadecyl, for example. In general, the substituents R and $R_1$, when alkyl, are preferably lower alkyl, e.g., of 1 to about 4 carbon atoms.

When the substituents R and $R_1$ are carbalkoxy the alkyl moiety is preferably lower alkyl.

Typical examples of the disubstituted ketenes having the Formula III are dimethylketene, ethylmethylketene, diethylketene, ethylbutylketene, dipropylketene, ethylisopropylketene, diisobutylketene, dibutylketene, di(tert. butyl)ketene, dipentylketene, dihexylketene, diheptylketene, dioctylketene, di(2-ethylhexyl)ketene, ethyldodecylketene, dioctadecylketene, camphoketene, dibenzylketene, ditolylketene, diallylketene, dicarbethoxyketene, tetramethyleneketene, pentamethyleneketene, hexamethyleneketene, diphenylketene, di(p - methoxyphenyl)ketene, methylphenylketene, allylmethylketene, methylcarbethoxyketene, ethylcarbethoxyketene, propylcarbomethoxyketene, and the like. As seen from the foregoing the expression "disubstituted ketene" includes ketenes wherein R and $R_1$ collectively are divalent radicals such as tetramethylene, pentamethylene, hexamethylene, etc., which, when joined to the same carbon atom, form a saturated carbocyclic ring.

N-alkenylsulfonamide compounds that can be used in the preparation of the new 3-sulfamidocyclobutanone compounds of the invention include:

N-methyl-N-vinylbenzenesulfonamide,
N-ethyl-N-vinylbenzenesulfonamide,
N-propyl-N-vinylbenzenesulfonamide,
N-isopropyl-N-vinylbenzenesulfonamide,
N-butyl-N-vinylbenzenesulfonamide,
N-tert. butyl-N-vinylbenzenesulfonamide,
N-ethyl-N-vinyl-p-toluenesulfonamide,
N-vinyl benzenesulfonamide,
N-vinyl-p-toluenesulfonamide,
N-methyl-N-vinylcyclohexanesulfonamide,
N-butyl-N-vinylcyclohexanesulfonamide,
N-methyl-N-vinyl-p-nitrobenzenesulfonamide,
N-butyl-N-vinyl-m-nitrobenzenesulfonamide,
N-methyl-N-vinylethanesulfonamide,
N-propyl-N-vinylethanesulfonamide,
N-methyl-N-vinylpropanesulfonamide,
N-butyl-N-vinylpropanesulfonamide,
N-methyl-N-vinylbutanesulfonamide,
N-ethyl-N-vinylbutanesulfonamide,
N-methyl-N-(1-propenyl)benzenesulfonamide,
N-ethyl-N-(1-propenyl)-p-methoxybenzenesulfonamide, N-methyl-N-(1-propenyl)-p-toluenesulfonamide,
N-methyl-N-(1-butenyl)benzenesulfonamide,
N-methyl-N-(1-propenyl)ethanesulfonamide,
N-butyl-N-(1-propenyl)ethanesulfonamide,
N-methyl-N-(1-propenyl)butanesulfonamide,
N-methyl-N-(1-butenyl)ethanesulfonamide,
N-methyl-N-(1-butenyl)butanesulfonamide, etc.

In accordance with customary practice when a specific alkyl group is referred to herein the normal form is intended unless otherwise indicated.

The novel 3-sulfamidocyclobutanol compounds of the invention can be prepared by reduction of the novel 3-sulfamidocyclobutanone compounds of the invention. In the reduction the carbonyl group of the 3-sulfamidocyclobutanone compound is reduced to a hydroxymethylene group. The reduction can be effected in any suitable manner desired. It can be effected, for example, by using hydrogen under pressure with metallic catalysts such as ruthenium, Raney nickel, Raney cobalt, various supported nickel catalysts, palladium, etc. The reduction can also be carried out with hydrogen at low pressures employing catalysts such as platinum or palladium. Reagents such as sodium and potassium borohydrides also can be used to effect the reduction.

In accordance with a process of the invention, the new 3-sulfamidocyclobutane compounds are prepared by reacting the disubstituted ketene and the N-alkenylsulfonamide at a temperature at which the reactants are fluids and below the decomposition temperatures. Equimolar ratios of the reactants are generally employed. After completion of the reaction the resulting 3-sulfamidocyclobutanone is isolated, for example, by recrystallization or distillation.

Suitable temperatures for the reaction are in the range of about 10° C. to about 200° C. For the most reactive ketenes such as diphenylketene and certain dialkylketenes (alkyl of 1–3 carbon atoms) a reaction temperature of about 10° C. to 40° C. is satisfactory, but for ketenes less reactive than those just mentioned, such as dialkylketenes having an alkyl group containing four or more carbon atoms, e.g. ethylbutylketene, higher reaction temperatures up to 200° C. are preferred, e.g. 60° C. to 200° C.

The reaction can be carried out with or without a solvent. Suitable inert solvents include, for example, ethyl alcohol, propyl alcohol, diethyl ether, diisopropyl ether, dioxane, tetrahydrofuran, diethylketone, methylisobutylketone, hexane, naphtha, isooctane, benzene, toluene, xylene, carbon tetrachloride, chloroform, tetrachloroethane, dimethyl formamide, dimethyl sulfoxide, acetonitrile, isobutyronitrile, ethyl acetate, butyl acetate, ethylene carbonate, etc.

The novel 3-sulfamidocyclobutanone compounds of the invention are useful as chemical intermediates. As noted hereinbefore, they can be reduced to the corresponding 3-sulfamidocyclobutanols. The novel 3-sulfamidocyclobutanone and 3-sulfamidocyclobutanol compounds of the invention are useful as plasticizers for cellulose ester resins, such as cellulose acetate, cellulose acetate butyrate or cellulose acetate propionate. The novel 3-sulfamidocyclobutanol compounds of the invention can be converted to useful surfactants by sulfation, e.g. with concentrated $H_2SO_4$ and conversion to the sodium sulfate salt.

The following examples illustrate the novel compounds and process of the invention:

Example 1

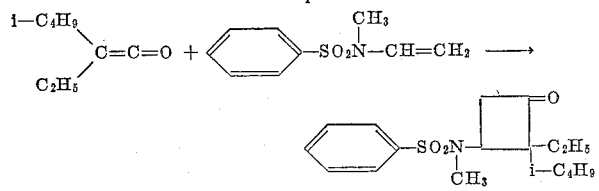

A solution of 19.4 g. (0.1 mole) of N-methyl-N-vinylbenzenesulfonamide and 12.6 g. (0.1 mole) of ethylisobutylketene in 60 ml. of toluene was refluxed for 10 hours. The reaction solution was stripped of low boilers up to a temperature of 180° at 0.5 mm. and then distilled in a molecular still to give 19.2 g. (60%) of N-methyl-N-(2-ethyl - 2-isobutyl - 3-oxocyclobutyl)benzenesulfonamide, B.P. 102–104° (1μ), $n_D^{20}$ 1.5292.

*Analysis.*—Calcd. for $C_{17}H_{25}NO_3S$: C, 63.2; H, 7.7; N, 4.3; S, 9.9. Found. C, 63.1; H, 7.9; N, 4.4; S, 10.0.

Example 2

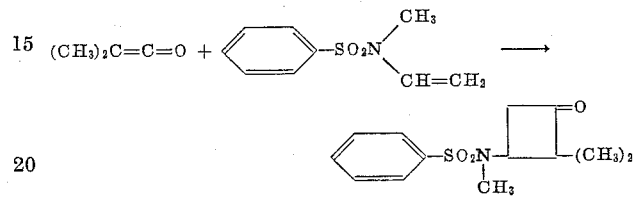

To a stirred solution of 40 g. (0.2 mole) of N-methyl-N-vinylbenzenesulfonamide in 100 ml. of benzene was added 14 g. (0.2 mole) of dimethylketene at room temperature. The reaction temperature rose slowly to 42° and stirring was continued for 8 hours. Distillation of the reaction solution through a 6-inch Vigreux column gave 22 g. of N-methyl-N-(2,2-dimethyl-3-oxocyclobutyl)benzenesulfonamide, B.P. 153–158° (0.3 mm.).

Example 3

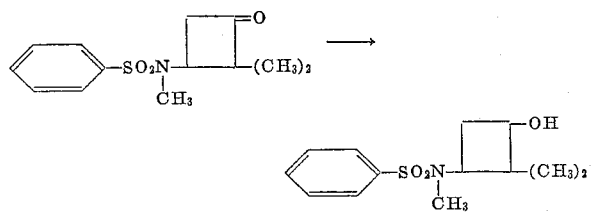

To a solution of 12 g. (.045 mole) of N-methyl-N-(2,2-dimethyl-3 - oxocyclobutyl)benzenesulfonamide in 40 ml. of ethanol was added slowly, with stirring, a solution of 0.57 g. (0.015 mole) of sodium borohydride in 5 ml. of water. The reaction mixture was refluxed for 1 hour and then evaporated on a steam bath. The residue was extracted several times with ether. The ether layer was evaporated and the viscous residue was distilled in a molecular still to give 8.7 g. of N-methyl-N-(2,2-dimethyl-3 - hydroxycyclobutyl)benzenesulfonamide, B.P. 112–116° (1μ).

*Analysis.*—Calcd. for $C_{13}H_{19}NO_3S$: C, 58.0; H, 7.1; N, 5.2; S, 11.9. Found: C, 58.2; H, 7.1; N, 5.0; S, 11.8.

Example 4

To a stirred solution of 197 g. (1.0 mole) of N-methyl-N-vinylsulfonamide in 500 ml. of acetonitrile under nitrogen was added 70 g. (1.0 mole) of dimethylketene. The reaction temperature was held at 25–35° C. by a cooling bath. After stirring for several hours, the reaction solution was distilled through a 12-inch Vigreux column to recover some tetramethyl - 1,3-cyclobutanedione and 127 g. of unchanged N-methyl-N-vinylsulfonamide, B.P. 113–114° (0.8 mm.). The distillation was continued in a molecular still to give 65 g. of N-methyl-N - (2,2 - dimethyl-3-oxocyclobutyl)benzenesulfonamide, B.P. 102° (2.3μ), $n_D^{20}$ 1.5429. This distillate slowly crystallized on cooling. A sample for analysis recrystallized from ethyl alcohol melted at 58–60°.

*Analysis.*—Calcd. for $C_{13}H_{17}NO_3S$: C, 58.4; H, 6.4; N, 5.2; S, 12.0. Found: C, 58.4; H, 6.4; N, 5.2; S, 12.2.

Example 5

Under the general conditions of Example 1, the following ketenes and N-alkenylsulfonamides give the products shown:

| Ketene | N-alkenylsulfonamide | Product |
|---|---|---|
| Diphenylketene | N-methyl-N-(1-propenyl)benzenesulfonamide | N-methyl-N-(2,2-diphenyl-4-methyl-3-oxocyclobutyl)-benzenesulfonamide. |
| Methylethylketene | N-butyl-N-vinylmethanesulfonamide | N-butyl-N-(2-methyl-2-ethyl-3-oxocyclobutyl)-benzenesulfonamide. |
| Ethylbutylketene | N-ethyl-N-vinyl-p-toluenesulfonamide | N-ethyl-N-(2-ethyl-2-butyl-3-oxocyclobutyl)-p-toluenesulfonamide. |
| Dioctylketene | N-methyl-N-vinylbenzylsulfonamide | N-methyl-N-(2,2-dioctyl-3-oxocyclobutyl)benzylsulfonamide. |
| Pentamethyleneketene | N-methyl-N-vinyl-p-nitrobenzenesulfonamide | 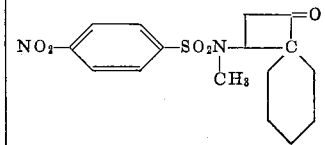 1-oxo-3-(N-methyl-p-nitrobenzenesulfonamide)spiro[3.5]nonane. |

Example 6

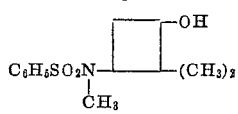

A solution of 80 g. of N-methyl-N-(2,2-dimethyl-3-oxocyclobutyl)benzenesulfonamide in 400 ml. of ethanol is hydrogenated in a rocking autoclave at 100° and 1500 p.s.i. for 3 hours over 10 g. of Raney nickel. The catalyst is removed by filtration and the solvent taken off under vacuum. The residue is distilled in a molecular still to give N-methyl-N-(2,2-dimethyl-3-hydroxycyclobutyl)benzenesulfonamide, B.P. 110–115° (1μ).

Example 7

A solution of 40 g. of N-methyl-N-(2,2-dimethyl-3-oxocyclobutyl)benzenesulfonamide in 150 ml. of ethyl acetate is hydrogenated in a rocking autoclave at 60° and 2000 p.s.i. over 10 g. of 5% ruthenium on carbon until no more hydrogen is absorbed. The catalyst is removed by filtration and the solvent taken off under vacuum. The residue is distilled in a molecular still to give a good yield of N-methyl-N-(2,2-dimethyl-3-hydroxycyclobutyl)benzenesulfonamide.

Example 8

Under the general conditions of Example 7, the following cyclobutanones are hydrogenated to the cyclobutanols shown:

| Cyclobutanone | Cyclobutanol |
|---|---|
| N-methyl-N-(2,2-diphenyl-4-methyl-3-oxocyclobutyl)-benzenesulfonamide. | N-methyl-N-(2,2-diphenyl-4-methyl-3-hydroxycyclobutyl)-benzenesulfonamide. |
| N-butyl-N-(2-methyl-2-ethyl-3-oxocyclobutyl)methanesulfonamide. | N-butyl-N-(2-methyl-2-ethyl-3-hydroxycyclobutyl)methanesulfonamide. |
| N-ethyl-N-(2-ethyl-2-butyl-3-oxocyclobutyl)-p-toluenesulfonamide. | N-ethyl-N-(2-ethyl-2-butyl-3-hydroxycyclobutyl)-p-toluenesulfonamide. |
| 1-oxo-3-(N-methyl-p-nitro-benzenesulfonamide)spiro[3.5] nonane. | 1-hydroxy-3-(N-methyl-p-amino-benzenesulfonamide)spiro[3.5]-nonane. |

Other 3-sulfamidocyclobutanone and 3-sulfamidocyclobutanol compounds of the invention that can be prepared in accordance with the teachings of the invention include:

N-methyl-N-(2,2-diethyl-3-oxocyclobutyl)benzenesulfonamide,
N-methyl-N-(2,2-dioctyl-3-oxocyclobutyl)benzenesulfonamide,
N-methyl-N-(2,2-dibutyl-3-oxycyclobutyl)benzenesulfonamide,
N-ethyl-N-(2,2-dimethyl-3-oxocyclobutyl)benzenesulfonamide,
N-propyl-N-(2,2-dimethyl-3-oxocyclobutyl)benzenesulfonamide,
N-butyl-N-(2,2-dimethyl-3-oxocyclobutyl)benzenesulfonamide,
N-methyl-N-(2,2,4-trimethyl-3-oxocyclobutyl)benzenesulfonamide,
N-methyl-N-(2,2-dimethyl-4-ethyl-3-oxocyclobutyl)benzenesulfonamide,
N-methyl-N-(2,2-dimethyl-4-butyl-3-oxocyclobutyl)benzenesulfonamide,
N-methyl-N-(2,2-diphenyl-3-oxocyclobutyl)benzenesulfonamide,
N-methyl-N-(2,2-dimethyl-3-oxocyclobutyl)methanesulfonamide,
N-methyl-N-(2,2-dimethyl-3-oxocyclobutyl)ethanesulfonamide,
N-methyl-N-(2,2-dimethyl-3-oxocyclobutyl)propanesulfonamide,
N-methyl-N-(2,2-dimethyl-3-oxocyclobutyl)butanesulfonamide,
N-methyl-N-(2,2-dimethyl-3-oxocyclobutyl)-p-toluenesulfonamide,
N-methyl-N-(2,2-dioctyl-3-oxocyclobutyl)-p-toluenesulfonamide,
N-(2,2,-diethyl-3-oxocyclobutyl)benzenesulfonamide,
N-(2,2-dioctyl-3-oxocyclobutyl)benzenesulfonamide, etc., and
N-methyl-N-(2,2-diethyl-3-hydroxycyclobutyl)benzenesulfonamide,
N-methyl-N-(2,2-dioctyl-3-hydroxycyclobutyl)benzenesulfonamide,
N-methyl-N-(2,2-dibutyl-3-hydroxycyclobutyl)benzenesulfonamide,
N-ethyl-N-(2,2-dimethyl-3-hydroxycyclobutyl)benzenesulfonamide,
N-propyl-N-(2,2-dimethyl-3-hydroxycyclobutyl)benzenesulfonamide,
N-butyl-N-(2,2-dimethyl-3-hydroxycyclobutyl)benzenesulfonamide,
N-methyl-N-(2,2,4-trimethyl-3-hydroxycyclobutyl)benzenesulfonamide,
N-methyl-N-(2,2-dimethyl-4-ethyl-3-hydroxycyclobutyl)benzenesulfonamide,
N-methyl-N-(2,2-dimethyl-4-butyl-3-hydroxycyclobutyl)benzenesulfonamide, N-methyl-N-(2,2-diphenyl-3-hydroxycyclobutyl)benzene-
sulfonamide,
N-methyl-N-(2,2,-dimethyl-3-hydroxycyclobutyl)
methanesulfonamide,
N-methyl-N-(2,2-dimethyl-3-hydroxycyclobutyl)
ethanesulfonamide,
N-methyl-N-(2,2,-dimethyl-3-hydroxycyclobutyl)
propanesulfonamide,
N-methyl-N-(2,2-dimethyl-3-hydroxycyclobutyl)butane-
sulfonamide,
N-methyl-N-(2,2-dimethyl-3-hydroxycyclobutyl)
p-toluenesulfonamide,
N-methyl-N-(2,2-dioctyl-3-hydroxycyclobutyl)
p-toluenesulfonamide,
  N-(2,2-diethyl-3-hydroxycyclobutyl)benzene-
    sulfonamide,
  N-(2,2-dioctyl-3-hydroxycyclobutyl)benzene-
    sulfonamide, etc.

Example 9

Twenty parts of N-methyl-N-(2,2-dimethyl-3-oxycyclo-butyl)benzenesulfonamide and 80 parts of cellulose acetate butyrate are milled together on heated rolls. The resulting plasticized resin is quite tough, has a good appearance and is easy to mold.

The ketene compounds employed in the preparation of the novel compounds of the invention can be prepared by methods known in the art, for instance, by methods described in "Organic Reactions," John Wiley & Sons, Inc., N.Y. (1946), vol. III, chapter 3. The disubstituted ketene reactants can also be prepared by the method described in copending application, Hasek and Elam, Ser. No. 841,961, filed Sept. 24, 1959, now U.S. Patent 3,201,-474, and in Hasek and Elam Canadian Patent 618,772.

Other catalysts that can be used in the catalytic hydrogenation of the 3-sulfamidocyclobutanone compounds of the invention to the 3-sulfamidocyclobutanol compounds of the invention include, for example, rhodium and copper chromite. The hydrogenation catalyst or catalysts can be used alone or can be supported on suitable materials such as carbon, alumina, kieselguhr, silica, etc. The hydrogenation reaction can be carried out, for example, at a temperature of from about 20° C. to about 180° C. and at a pressure of from 1 atmosphere to about 400 atmospheres.

The temperatures referred to herein are expressed in degrees centigrade.

The N-alkenylsulfonamide compounds used in the preparation of the novel compounds of the invention are described by Cairns and Sauer in J. Org. Chem., 20, 627 (1955).

Although the invention has been described in considerable detail with particular reference to certain preferred embodiments thereof, variations and modifications can be effected within the spirit and scope of the invention as described hereinbefore, and as defined in the appended claims.

I claim:

1. A 3-sulfamidocyclobutane derivative selected from the group of 3-sulfamidocyclobutanone and 3-sulfamidocyclobutanol having, respectively, the following structural formulae:

I.

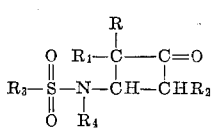

and

II.

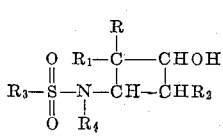

wherein R and $R_1$ is a substituent selected from (a) an alkyl radical having 1–8 carbon atoms, (b) a phenyl radical, (c) an alkoxyphenyl radical in which the alkoxy moiety contains 1–4 carbon atoms, (d) a methylphenyl radical, (e) an allyl radical, or (f) a carbalkoxy radical wherein the alkoxy moiety has 1–8 carbon atoms and wherein R and $R_1$ collectively, together with the carbon atom of the cyclobutane ring to which they are attached, is a carbocyclic ring containing 5–7 carbon atoms in the ring, $R_2$ and $R_4$ are hydrogen or an alkyl radical having 1–4 carbon atoms, and $R_3$ is a substituent selected from (a) an alkyl radical having 1–4 carbon atoms, (b) a phenyl radical, (c) a cyclohexyl radical, or (d) a nitrophenyl radical.

2. A 3-sulfamidocyclobutanone derivative as defined in claim 1.

3. A 3-sulfamidocyclobutanol derivative as defined in claim 1.

4. A 3-sulfamidocyclobutanone derivative having the formula:

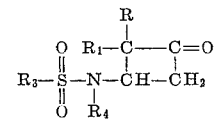

wherein R and $R_1$ is a substituent selected from (a) an alkyl radical having 1–8 carbon atoms, (b) a phenyl radical, (c) an alkoxyphenyl radical in which the alkoxy moiety contains 1–4 carbon atoms, (d) a methylphenyl radical, (e) an allyl radical, or (f) a carbalkoxy radical wherein the alkoxy moiety has 1–8 carbon atoms and wherein R and $R_1$ collectively, together with the carbon atom of the cyclobutane ring to which they are attached, is a carbocyclic ring containing 5–7 carbon atoms in the ring, $R_3$ is an aryl radical selected from phenyl, nitrophenyl, methylphenyl, or alkoxyphenyl in which the alkoxy moiety contains 1–4 carbon atoms, and $R_4$ is an alkyl radical having 1–4 carbon atoms.

5. A 3-sulfamidocyclobutanone having the formula:

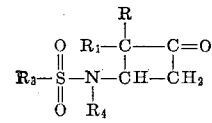

wherein R, $R_1$ and $R_4$ each represents an alkyl radical having 1–4 carbon atoms and $R_3$ represents a phenyl nucleus.

6. A 3-sulfamidocyclobutanone having the formula:

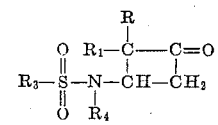

wherein R, $R_1$, $R_3$ and $R_4$ are alkyl radicals having 1–4 carbon atoms.

7. A 3-sulfamidocyclobutanol compound having the formula:

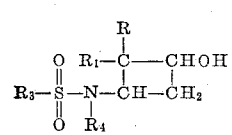

wherein R and $R_1$ is a substituent selected from (a) an alkyl radical having 1–8 carbon atoms, (b) a phenyl radical, (c) an alkoxyphenyl radical in which the alkoxy moiety contains 1–4 carbon atoms, (d) a methylphenyl radical, (e) an allyl radical or (f) a carbalkoxy radical wherein the alkoxy moiety has 1–8 carbon atoms and wherein R and $R_1$ collectively, together with the carbon atom of the cyclobutane ring to which they are attached, is a carbocyclic ring containing 5–7 carbon atoms in the ring, $R_3$ represents an aryl radical selected from phenyl, nitrophenyl, methylphenyl, or alkoxyphenyl in which the alkoxy moiety contains 1–4 carbon atoms, and $R_4$ represents an alkyl radical having 1–4 carbon atoms.

8. A 3-sulfamidocyclobutanol having the formula:

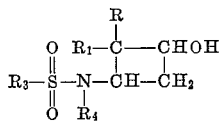

wherein each of R, $R_1$ and $R_4$ is an alkyl radical of 1–4 carbon atoms and $R_3$ is a phenyl nucleus.

9. N-methyl-N-(2,2-dimethyl - 3 - oxocyclobutyl)benzenesulfonamide.

10. N-methyl-N - (2-ethyl-2-isobutyl-3-oxocyclobutyl) benzenesulfonamide.

11. N-methyl-N-(2,2-diphenyl - 4 - methyl-3-oxocyclobutyl)benzenesulfonamide.

12. N - butyl - N - (2-methyl-2-ethyl-3-oxocyclobutyl) benzenesulfonamide.

13. N-ethyl-N-(2-ethyl-2-butyl - 3 - oxocyclobutyl)benzenesulfonamide.

14. N-methyl-N - (2,2-dimethyl-3-hydroxycyclobutyl) benzenesulfonamide.

15. N-methyl-N-(2-ethyl - 2 - isobutyl-3-hydroxycyclobutyl)benzenesulfonamide.

16. N-methyl-N-(2,2-diphenyl-4-methyl - 3 - hydroxycyclobutyl)benzenesulfonamide.

17. N-butyl - N - (2-methyl-2-ethyl-3-hydroxycyclobutyl)benzenesulfonamide.

18. N-ethyl-N - (2-ethyl-2-butyl-3-hydroxycyclobutyl) benzenesulfonamide.

19. A process for prepared a 3-sulfamidocyclobutanone having the following structure formula:

I.

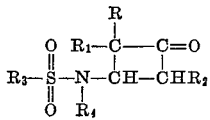

wherein R and $R_1$ is a substituent selected from (a) an alkyl radical having 1–8 carbon atoms, (b) a phenyl radical, (c) an alkoxyphenyl radical in which the alkoxy moiety contains 1–4 carbon atoms, (d) a methylphenyl radical, (e) an allyl radical, or (f) a carbalkoxy radical wherein the alkoxy moiety has 1–8 carbon atoms and wherein R and $R_1$ collectively, together with the carbon atoms of the cyclobutane ring to which they are attached, is a carbocyclic ring containing 5–7 carbon atoms in the ring, $R_2$ and $R_4$ are hydrogen or an alkyl radical having 1–4 carbon atoms, and $R_3$ is a substituent selected from (a) an alkyl radical having 1–4 carbon atoms, (b) a phenyl radical, (c) a cyclohexyl radical, or (d) a nitrophenyl radical, which comprises reacting at a temperature of 10–200° C. substantially equimolar amounts of a ketene having the formula:

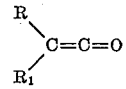

wherein R and $R_1$ are as defined as above with a N-alkenylsulfonamide having the formula:

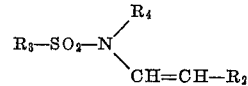

wherein $R_2$, $R_3$, and $R_4$ are as defined above.

20. The process of claim 19 in which the reaction is carried out in the presence of an inert solvent.

References Cited

Morrison et al.: Organic Chemistry, pp. 629–30 (1959).
Opitz et al.: Angew. Chem., vol. 73, p. 654 (1961).
Opitz et al.: Angew. Chem., vol. 74, p. 32 (January 1962).

WALTER A. MODANCE, *Primary Examiner.*

HARRY J. MOATZ, *Assistant Examiner.*